US005927243A

United States Patent [19]

Cikanek, Jr. et al.

[11] Patent Number: 5,927,243

[45] Date of Patent: Jul. 27, 1999

[54] INTERNAL COMBUSTION ENGINE WITH SIAMESED CYLINDER BORES AND PISTONS

[75] Inventors: Harry Arthur Cikanek, Jr., Northville; Josef Wandeler, Milford; Daniel Michael Kabat, Oxford; Mark Michael Madin, Canton, all of Mich.

[73] Assignee: Ford Global Technologies, Inc., Dearborn, Mich.

[21] Appl. No.: 08/996,162

[22] Filed: Dec. 22, 1997

[51] Int. Cl.[6] .......... F16J 1/00

[52] U.S. Cl. .......... 123/193.2; 123/193.6; 123/193.4; 92/177

[58] Field of Search .......... 123/193.4, 193.2, 123/193.6; 92/177

[56] References Cited

U.S. PATENT DOCUMENTS

| | | | |
|---|---|---|---|
| 4,256,067 | 3/1981 | Fukui | 123/193.6 |
| 4,306,730 | 12/1981 | Honda et al. . | |
| 4,362,135 | 12/1982 | Irimajiri | 123/193.6 |
| 4,466,400 | 8/1984 | Irimajiri et al. . | |
| 4,471,730 | 9/1984 | Honda . | |
| 4,671,219 | 6/1987 | Ooyama et al. . | |
| 4,671,228 | 6/1987 | Tomita et al. . | |
| 4,756,241 | 7/1988 | Sakurahara et al. . | |
| 4,951,621 | 8/1990 | Tomita et al. . | |
| 5,211,101 | 5/1993 | Letsch et al. | 92/177 |

FOREIGN PATENT DOCUMENTS

| | | |
|---|---|---|
| 2 199 922 | 3/1989 | United Kingdom . |

*Primary Examiner*—Marguerite McMahon
*Attorney, Agent, or Firm*—Jerome R. Drouillard

[57] ABSTRACT

A reciprocating internal combustion engine includes a siamesed piston bore having a configuration formed by the intersection of two circular cylindrical elements and a matching piston having a similar siamesed configuration. This cylinder configuration allows a four cylinder engine to be about 25% shorter with the same displacement as an engine having circular cylinders and the same stroke.

14 Claims, 4 Drawing Sheets

INTERNAL COMBUSTION ENGINE WITH SIAMESED CYLINDER BORES AND PISTONS

FIELD OF THE INVENTION

The present invention relates to a space saving cylinder block arrangement in which a 25% net reduction of length may be achieved, for example, as compared with a four cylinder in-line engine having circular cylinders, the same displacement. For a V-block engine having a 60° bank angle, the savings in length would be about 30%.

BACKGROUND INFORMATION

Although reciprocating internal combustion engines have traditionally incorporated circular cylinder bores, some engine designers have developed oblong and elliptical cross section cylinders. In general, noncircular cylinder bores offer advantages in terms of both smaller engine package volume as well as a potential for increasing intake and exhaust port area as compared with conventional circular cylinders. Of course, improved flow through cylinder ports may be translated into increased engine efficiency and power output. Unfortunately, the fabrication and assembly of components for noncircular cylinder engines has been difficult because special machining operations have been required for maintaining accuracy in the fabrication of the complex curves presented by the cylinder bores.

The present invention provides a noncircular piston bore having pistons and bores which employ simple circular design elements. An engine having a configuration according to the present invention may be produced with conventional boring and honing equipment. And, piston rings used with the present engine need not be of the more expensive spring loaded type used with conventional noncircular cylinder engines.

The present engine architecture offers an additional advantage for lean burn engines. When employing lean burn, a smaller combustion chamber is advantageous. Smaller combustion chambers promote high turbulence, mixed flow, and uniform small-to-moderate eddy flow structures, which all support good combustion. The present invention allows smaller combustion chambers to be used with a larger cylinder displacement.

SUMMARY OF THE INVENTION

A reciprocating internal combustion engine includes a connecting rod adapted for attaching a piston to a crankshaft, and a cylinder block having at least one siamesed piston bore having a configuration formed by the intersection of two circular cylindrical elements. A piston is reciprocably housed within the piston bore. The configuration of the piston is siamesed and matched to that of the piston bore. The piston is attached to the connecting rod by means of a wrist pin.

An engine according to the present invention may have a plurality of piston bores with each having a piston housed therein. Piston rings used with an engine according to the present invention may preferably be of one-piece construction having a figure-eight configuration and a single end gap which may be positioned equidistant from the loci of intersection of the two circular cylindrical elements forming the piston bore. Alternatively, the piston ring may comprise a two-piece ring, with each of the pieces comprising a circular segment having two ends, with the piston ring pieces abutting each other at the bight of the piston bore. In this case, the piston ring pieces may be pinned to the piston to prevent rotation about a longitudinal axis of the piston bore.

According to another aspect of the present invention, an engine further comprises a cylinder head having at least one intake valve, at least one exhaust valve, and at least one spark plug, with the cylinder head, the piston, and the piston bore defining a figure-eight shaped combustion chamber. In a preferred embodiment, at least one intake valve is located at a first end of the combustion chamber and at least one exhaust valve is located at a second end or opposite end of the combustion chamber. At least one spark plug is used, and the spark plug is preferably located approximately one-half the distance between the first and second ends of the combustion chamber.

Although a wide range of values is possible, it has been determined that an engine according to the present invention may preferably be configured such that the angle included between the intersections of the circular cylindrical elements is 90 degrees.

It is an advantage of the present invention that the cylindrical elements may be sized such that an engine having piston bores and pistons according to the present invention, and being of four cylinders, may have a length which is approximately 25% less than the length of a four cylinder engine having the same displacement and same stroke and circular piston bores. Alternatively, a cylinder block housing four pistons according to the present invention and having the same length as a four cylinder engine block having circular piston bores, will have about 82% greater displacement than the engine having circular piston bores and the same stroke.

It is a further advantage of the present invention that a cylinder block according to the present invention may be finished using conventional boring and honing machinery used for finishing cylinder blocks having circular cylinder bores.

It is a further advantage of the present invention that for a given cylinder bore cross section, the diameters of the sub-chambers and sub-cylinders are greatly reduced so as to promote a rapid traverse of the combustion chamber during each combustion event.

Other advantages and features of the present invention will become apparent to the reader of this specification.

DETAILED DESCRIPTION OF PREFERRED EMBODIMENTS

Figure 1:
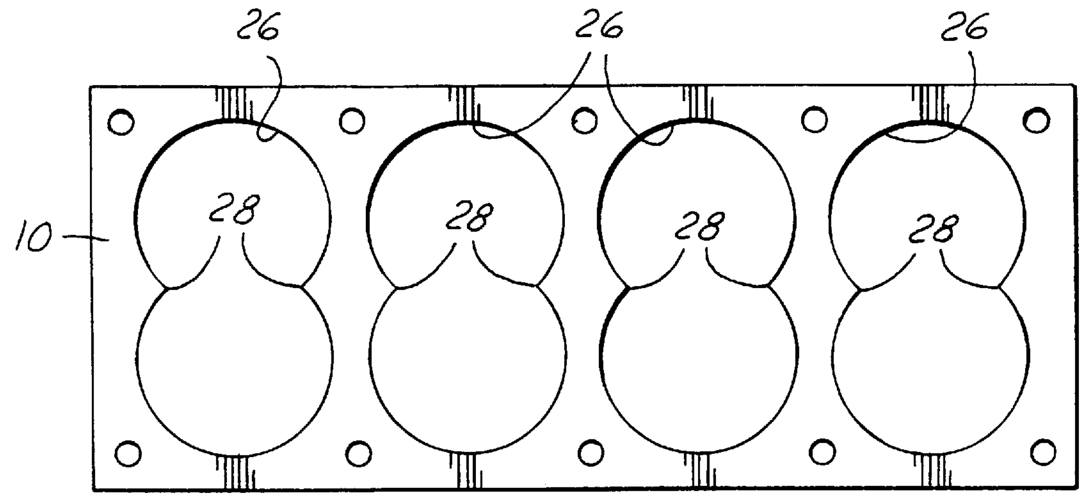
FIG. 1 is a plan view of a cylinder block according to the present invention.

As shown in FIG. 1, cylinder block 10 has a plurality of piston bores 26, with each bore being siamesed and having a configuration formed by the intersection of two circular cylindrical elements. A piston according to the present invention is shown in FIG. 3. Piston 34 has a configuration which mimics that of piston bores 26. In other words, piston 34 is itself siamesed, with its configuration being defined by the intersection of two circular cylinders. Piston 34 has a plurality of piston ring grooves 38 formed therein, and these ring grooves perform the function of the ring grooves in a conventional piston. Finally, the piston 34 has a wrist pin bore 36 therein for attachment to connecting rod 32 (FIG. 2).

Figure 2:
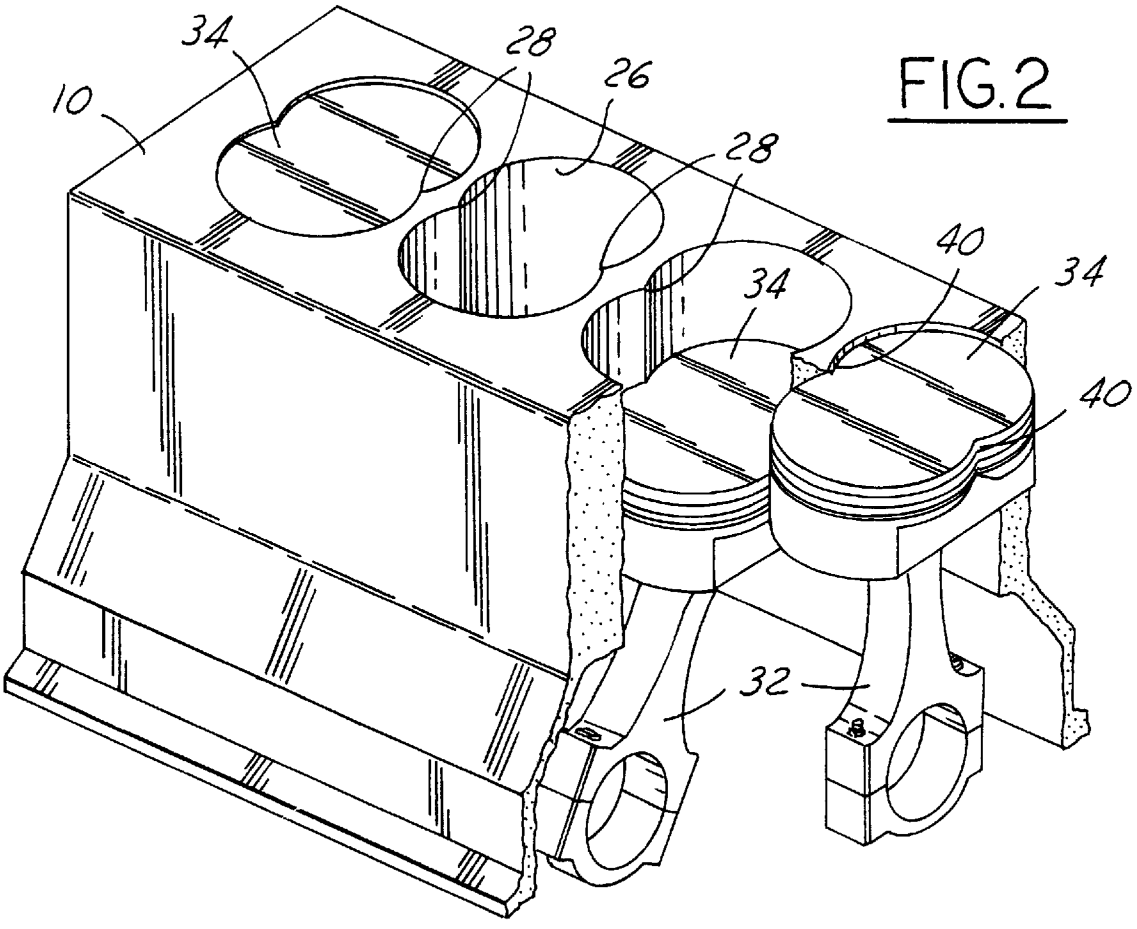
FIG. 2 is a perspective, partially cutaway view of a cylinder block and pistons according to the present invention.
Figure 3:
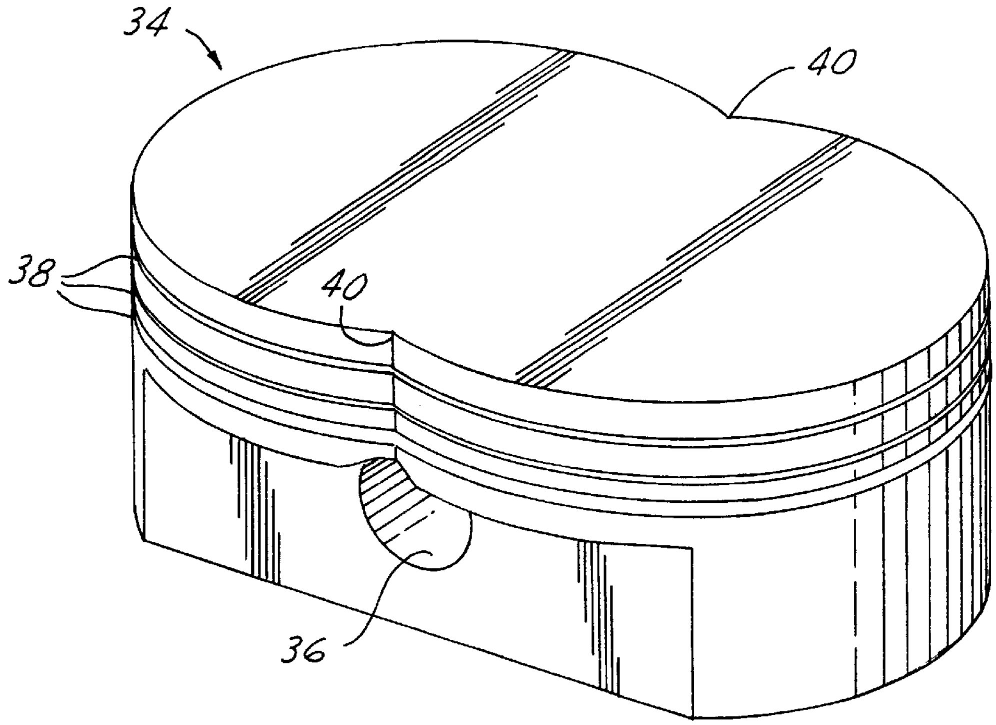
FIG. 3 is a perspective view of a piston according to the present invention.

FIG. 2 shows that an engine according to the present invention may have very short axial length running in the direction of the axis of the crankshaft, but with considerably greater displacement than an engine having circular cylinder bores but the same overall length. This comparison, as are all other comparisons in this specification, is made with the underlying assumption that the strokes are the same for each engine. It is of course possible to employ the present invention with either single or multicylinder engines having a plurality of configurations, including in-line and V-block configurations and others known to those skilled in the art and suggested by this disclosure.

Figure 4:
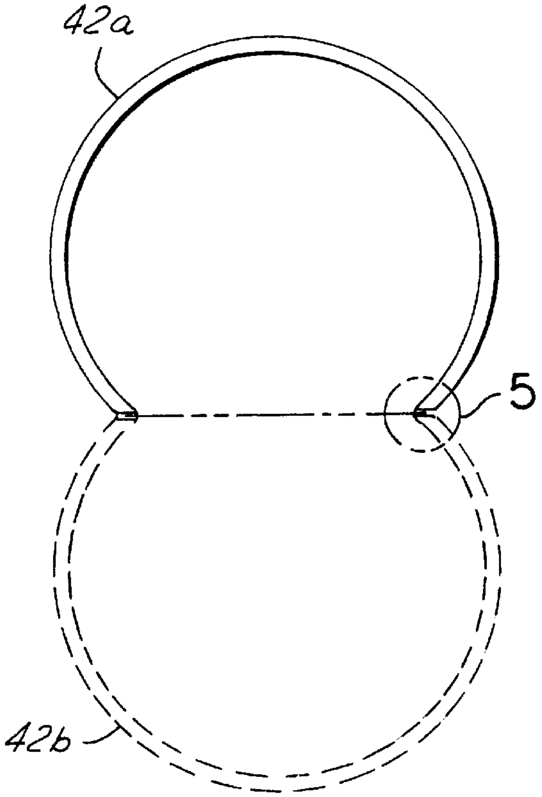
FIG. 4 is a plan view of a two-piece piston ring assembly according to the present invention.
Figure 5:
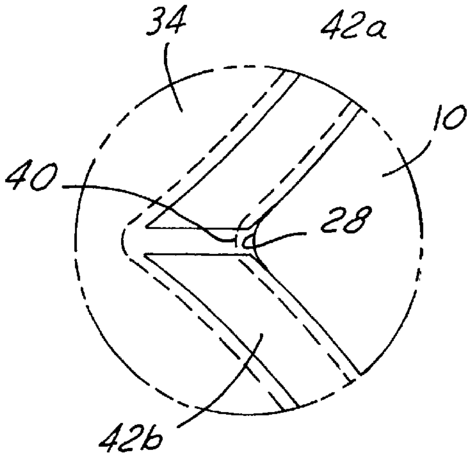
FIG. 5 is an enlarged view of a portion of piston ring of FIG. 4 taken from the circle labeled 5.
Figure 7:
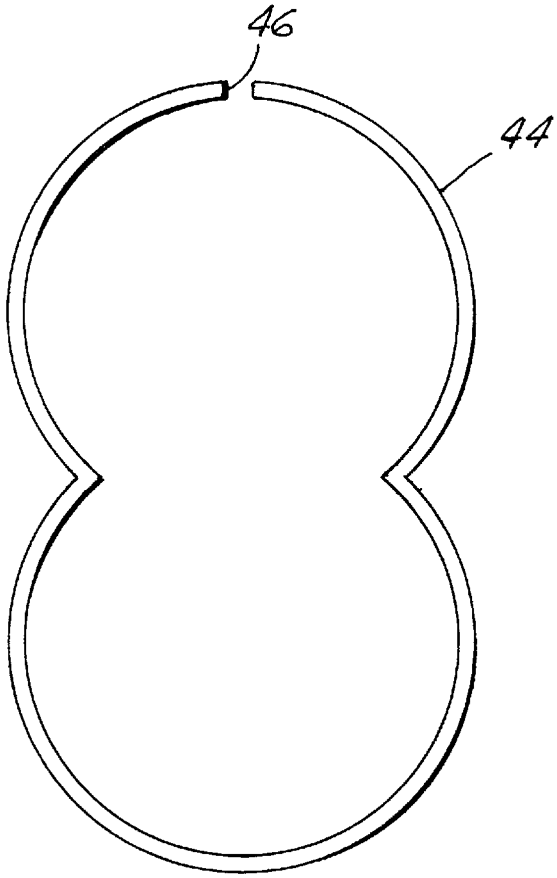
FIG. 7 is illustrates a one-piece piston ring for an engine according to the present invention.

Piston rings having preferred configurations for an engine according to the present invention are shown in FIGS. 4, 5 and 7. Particular attention must be paid to the areas of the bights 28 defined by the intersection of the circular cylindrical elements in block 10, which correspond with bights 40 formed by the intersection of circular elements forming the configuration of pistons 34.

FIG. 4 illustrates two-piece piston ring 42 in which each of ring pieces 42*a* and 42*b* has a circular configuration. This is advantageous because such piston rings may be easily constructed using well known techniques currently employed for the building of piston rings for conventional engines.

FIG. 5 illustrates the area of the end gap between two-piece ring elements 42*a* and 42*b*. In order to properly maintain the clearance between elements 42*a* and 42*b*, these elements may be pinned.

FIG. 7 illustrates one-piece piston ring 44 having a single end gap 46 which is positioned equidistant from the loci of the intersection of the two circular cylindrical elements forming the piston bore. In other words, the end gap is equidistant from bights 40 of piston 34. Because piston ring 44 is one piece, ring 44 is not able to shift about an axis parallel to the centerline of the piston bore and this obviates the need for pinning or other such fastening of the piston ring.

Figure 8:
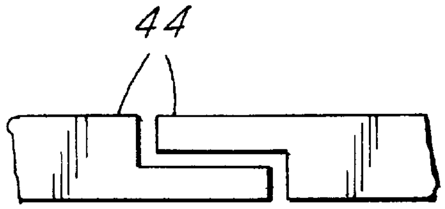
FIG. 8 illustrates a piston ring end-gap detail for the piston ring illustrated in FIG. 7.

FIG. 8 illustrates a stepped end-gap feature which may be employed with the piston ring of FIG. 7.

Figure 6:
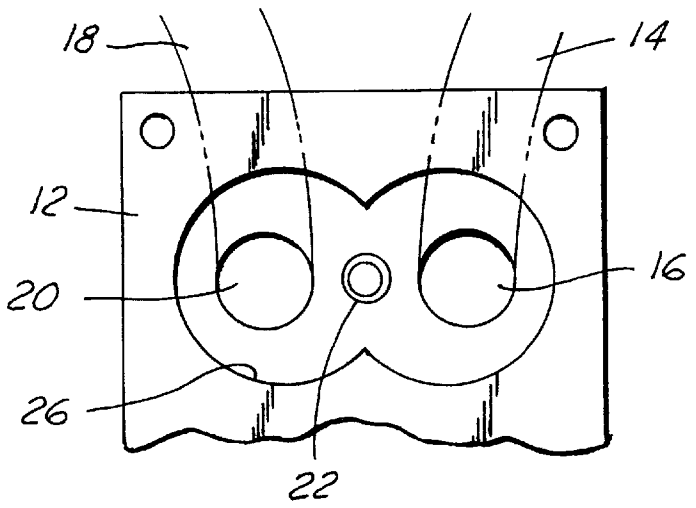
FIG. 6 is a cylinder head for one cylinder of an engine according to the present invention.

FIG. 6 illustrates a low cost cylinder head suitable for use with an engine according to the present invention. Cylinder head 12 has intake port 14 servicing intake valve 16 and exhaust port 18 servicing exhaust valve 20. Spark plug 22 is located equidistant between the first end of the cylinder in which the intake valve 16 is located and the second end of the cylinder in which exhaust valve 20 is located. The design is especially useful for use with lean burn systems for the following reasons.

Figure 9A:
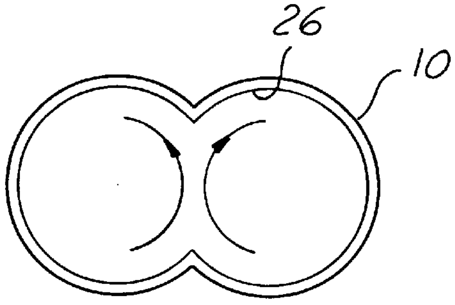
FIGS. 9 and 10 illustrate various multi-valve engine combinations according to additional aspects of the present invention.
Figure 10A:
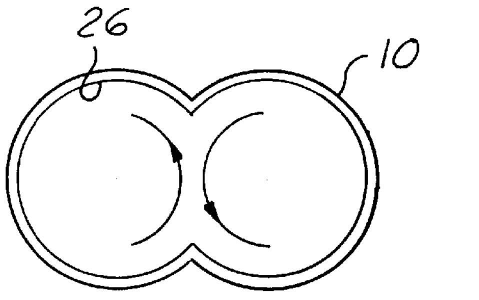

FIGS. 9 and 10 illustrate various multivalve combinations according to another aspect of the present invention. FIG. 9A is a schematic representation of cylinder block 10 showing synchronous flow in which the in-cylinder charge motion is in the same direction at the geometric center of piston bore 26. Conversely, FIG. 10A is a schematic representation of cylinder block 10 showing a counterflow in which the in-cylinder charge motion is in opposite directions at the geometric center of piston bore 26. These different configurations may be dictated by design requirements imposed upon an engine constructed according to the present invention.

Figure 9B:
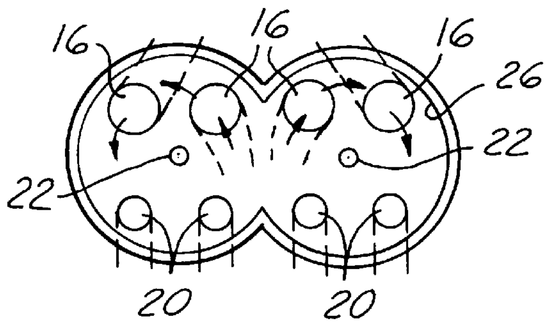
Figure 9C:
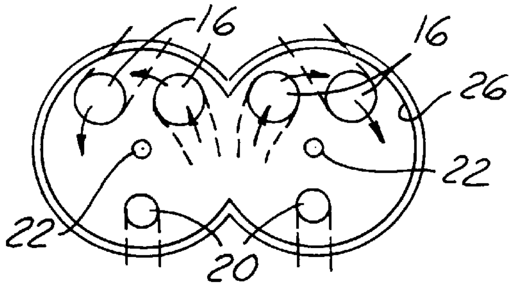

FIG. 9B illustrates a synchronous flow engine in which intake valves 16 and their intake ports are located such that the charge motion is additive at the center of the combustion chamber. Note that multiple exhaust valves 20 are used. FIG. 9C, on the other hand, illustrates an engine in which a single exhaust valve 20 is used for each sub-cylinder.

Figure 10B:
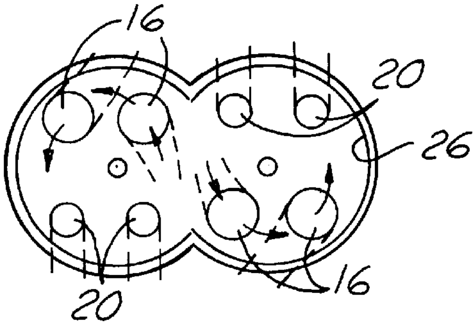
Figure 10C:
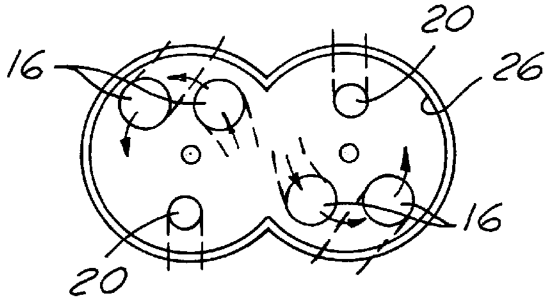

FIG. 10B illustrates a counterflow engine in which the charge motion, although being in the same counterclockwise direction in each sub-cylinder, subtracts at the center of the combustion chamber. In other words, the individual sub-cylinder flows are asynchronous. This is true for both the 4 and 3 valve configurations shown in FIGS. 10B and 10C, respectively.

While the invention has been shown and described in its preferred embodiments, it will be clear to those skilled in the arts to which it pertains that many changes and modifications may be made thereto without departing from the scope of the invention.

We claim:

1. A reciprocating internal combustion engine, comprising:

a connecting rod adapted for attaching a piston to a crankshaft;

a cylinder block having at least one siamesed piston bore having a configuration formed by the intersection of two circular cylindrical elements; and a piston reciprocably housed within said piston bore, with said piston being attached to the connecting rod and having a siamesed configuration matched to said piston bore.

2. An engine according to claim 1, wherein said cylinder block comprises a plurality of piston bores, with each having one of said pistons housed therein.

3. An engine according to claim 1, wherein said piston has a one-piece piston ring attached thereto, with said piston ring having a figure-eight configuration.

4. An engine according to claim 3, wherein said piston ring has a single end gap positioned equidistant from the loci of intersection of the two circular cylindrical elements forming the piston bore.

5. An engine according to claim 1, wherein said piston further comprises a two-piece piston ring, with each of said pieces comprising a circular segment having two ends, with said pieces abutting each other at the bight of the piston bore.

6. An engine according to claim 5, wherein each of said piston ring pieces is pinned to said piston to prevent rotation about a longitudinal axis of the piston bore.

7. An engine according to claim 1, further comprising a cylinder head having at least one intake valve, at least one exhaust valve, and at least one spark plug, with said cylinder head, said piston, and said piston bore defining a figure eight-shaped combustion chamber.

8. An engine according to claim 6, wherein said at least one intake valve is located at a first end of the combustion chamber, and said at least one exhaust valve is located at a second end of the combustion chamber, with said at least one spark plug being located approximately one-half of the distance between the first and second ends of the combustion chamber.

9. An engine according to claim 1, wherein the angle included between the intersections of said circular cylindrical elements is 90°.

10. An engine according to claim 1, wherein said cylindrical elements have a common diameter, with said diameter being selected such that a cylinder block housing four pistons will have a length which is approximately twenty-five percent less than the length of a four cylinder engine block of the same displacement and having circular piston bores.

11. An engine according to claim 1, wherein said cylindrical elements have a common diameter, with said diameter being selected such that a cylinder block housing four pistons will have a length which is the same as the length a four cylinder engine having circular piston bores and a displacement which is about forty-five percent less.

12. A reciprocating internal combustion engine, comprising:

a connecting rod adapted for attaching a piston to a crankshaft;

a cylinder block having at least one siamesed piston bore having a configuration formed by the intersection of two circular cylindrical elements so as to form two sub bores;

a piston reciprocably housed within said piston bore, with said piston being attached to the connecting rod and having a siamesed configuration matched to said piston bore; and a cylinder head having a plurality of intake valves for bringing fresh charge into a combustion chamber formed by the piston bore, the piston and the cylinder head.

13. An engine according to claim 12, wherein said intake valves are arranged such that the charge motion within the sub bores is synchronous.

14. An engine according to claim 12, wherein said intake valves are arranged such that the charge motion within the sub bores is asynchronous.

* * * * *